March 11, 1952

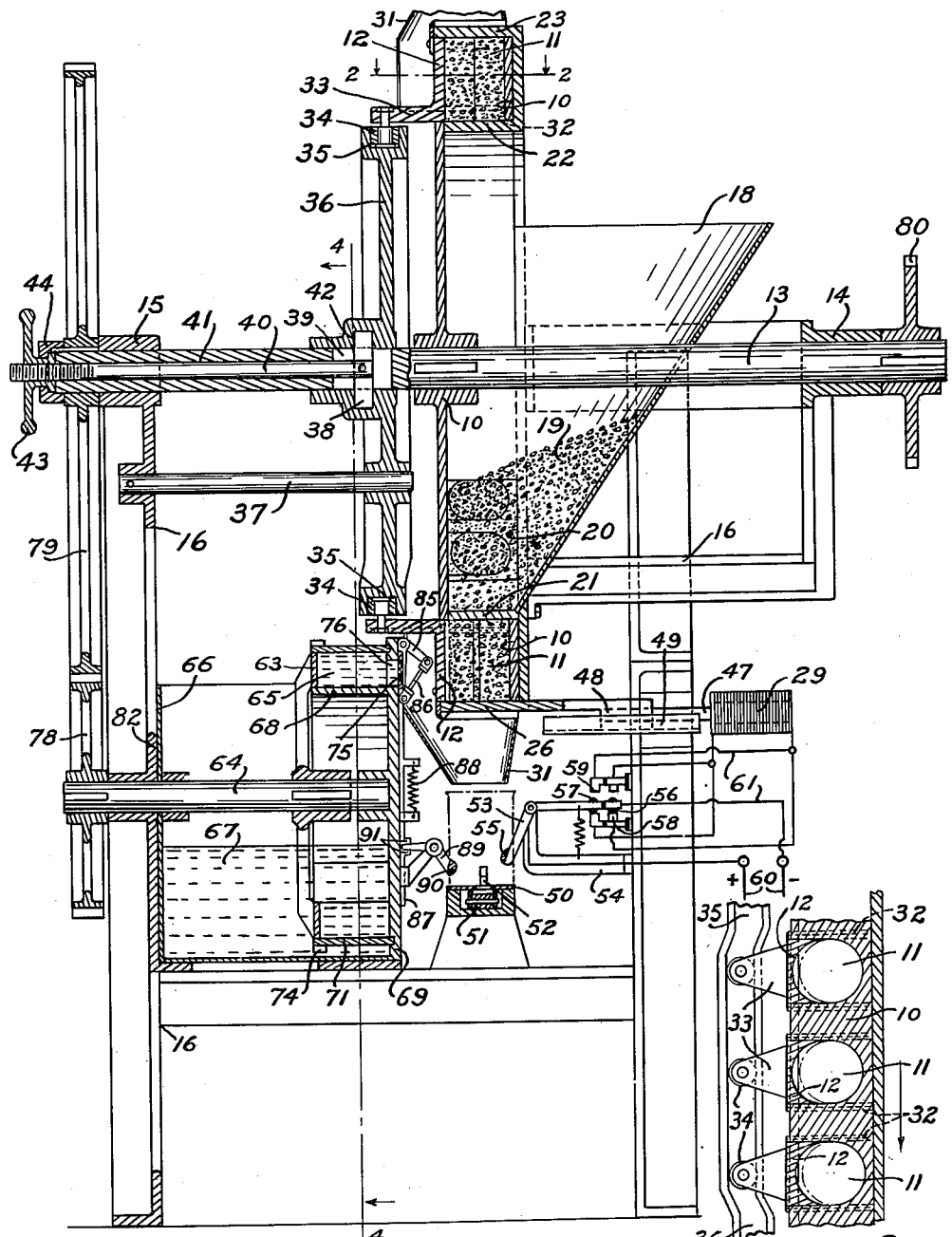

F. D. CHAPMAN 2,588,483

RECEPTACLE FILLER

Filed Nov. 18, 1946

INVENTOR.
F. D. Chapman
BY
Lieber & Lieber
ATTORNEYS

March 11, 1952 F. D. CHAPMAN 2,588,483
RECEPTACLE FILLER
Filed Nov. 18, 1946 3 Sheets-Sheet 3
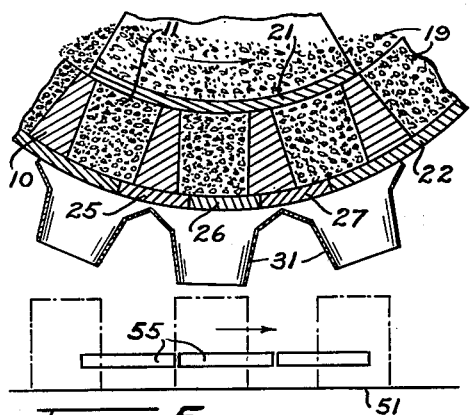
FIG. 5.
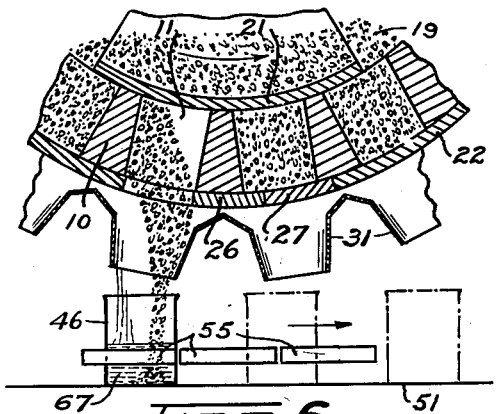
FIG. 6.
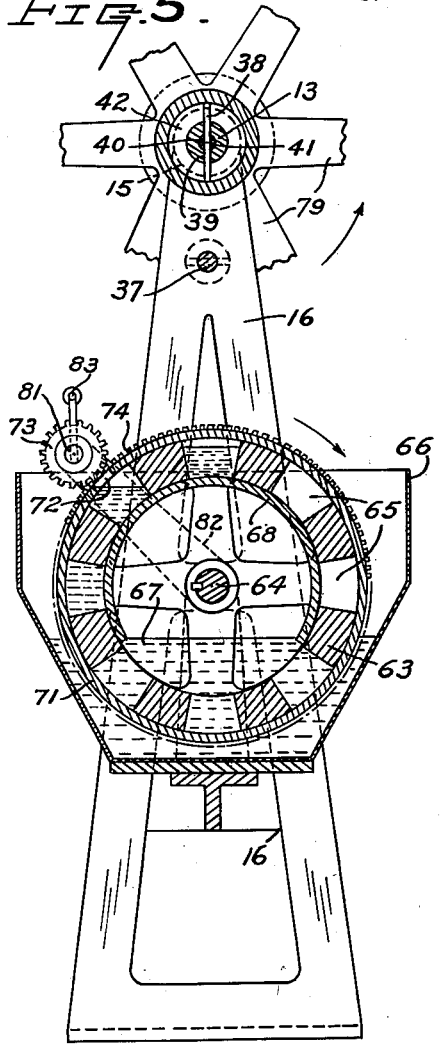
FIG. 4.
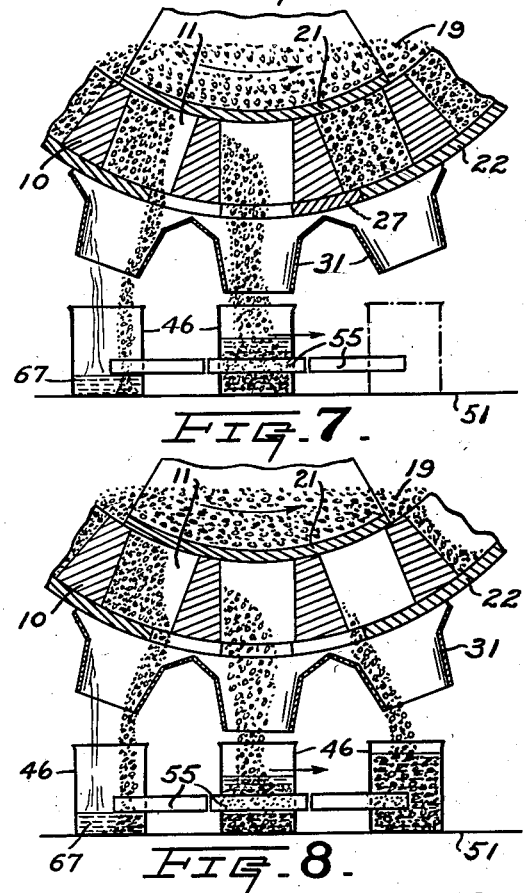
FIG. 7.
FIG. 8.
INVENTOR.
F. D. Chapman
BY
Lieber & Lieber
ATTORNEYS.

Patented Mar. 11, 1952

2,588,483

UNITED STATES PATENT OFFICE 2,588,483

RECEPTACLE FILLER

Frank D. Chapman, Berlin, Wis.

Application November 18, 1946, Serial No. 710,547

18 Claims. (Cl. 226—99)

1

The present invention relates generally to improvements in the art of packing diverse commodities, and relates more specifically to improvements in the construction and operation of mechanisms for automatically measuring and for delivering successive pre-measured batches, of bulk materials to a succession of receptacles advancing along a definite path.

The principal object of this invention is to provide an improved machine which is effectively operable either at high or low speeds, and which is adapted to deliver accurately pre-measured batches of either granular material alone, or mixtures of granular material and liquid, to successive receptacles travelling a definite course, without wasting any of the commodity.

Numerous types of filling machines for measuring and delivering batches of diverse commodities to a succession of open topped cans or other receptacles advancing along a definite path, have heretofore been utilized by the canning industry; and while some of these prior mechanisms were adapted to fill the receptacles with granular materials such as peas and beans mixed with liquid such as brine or syrup, while operating at limited speeds, all of them were relatively objectionable when operated at high speeds. In most of the previous can fillers, the measuring pockets and the receptacles were caused to revolve about a common axis and the measured batches were delivered to the cans while thus advancing, and when the speed of revolution was increased beyond a certain value, either the liquid or the solids or both would be thrown from the open tops of the rapidly advancing containers, and considerable waste of material as well as inaccurate filling resulted. Then too, many of the prior machines of this type were relatively complicated and cumbersome and most of them could not be readily adjusted so as to accurately vary either the volumes of the measured batches or the relative proportions of the ingredients in the mixture, while others were not sufficiently dependable in operation to eliminate prolonged and expensive delays caused by necessary repairs and resultant idleness.

It is therefore a more specific object of my present invention to provide an improved can filling machine operable at high speed to effectively deliver accurately measured batches of granular material alone, or mixed batches of liquid and granular material in predetermined proportions, to an advancing series of open topped receptacles proceeding rapidly along a rectilinear path.

2

Another specific object of the present invention is to provide an improved automatic filler for delivering batches of bulk material such as peas or beans to successive receptacles advancing at high speed along a straight line, wherein the volumes of the batches may be quickly and conveniently adjusted without prolonged stoppage of the machine.

An additional specific object of this invention is to provide an improved measuring and feeding mechanism for accurately pre-measuring successive batches of both liquid and solids, and for depositing one measured batch of each of the commodities into each of a succession of cans or other receptacles constantly travelling past the mechanism at high speed.

A further specific object of the invention is to provide a simple and durable batch measuring and dispensing assemblage for granular materials and mixtures of granular materials and liquids, all parts of which are readily accessible for inspection, cleansing, and adjustment, and wherein the measured batches of solids are quickly released for free deposition into the receptacles.

Still another specific object of my invention is to provide an improved can filling machine for packing commodities such as peas or beans, wherein waste of commodity is minimized, and in which delivery of measured batches is automatically avoided when no cans are available to receive the batches.

Another specific object of the invention is to provide a compact and sturdy high speed filler which may be manufactured, installed and operated at moderate cost, and which is adapted for diverse uses.

A further specific object of my present invention is to provide a combined liquid and granular material batch measuring and delivery assembly, comprising simultaneously operable but independently functioning machines for accurately and automatically measuring batches of the respective commodities, and which are cooperable to deliver either liquid alone, or granular material alone, or mixtures of liquid and granular material, to successive receptacles advancing along a definite path.

The above and other specific objects and advantages of the invention will be apparent from the following detailed description; and some of the novel features pertaining strictly to liquid fillers alone, and which are shown and described herein, constitute no specific part of my present improvement.

A clear conception of the features constituting the present invention, and of the manner of constructing and operating a typical can filler embodying the same, may be had by referring to the drawings accompanying and forming a part of this specification wherein like reference characters designate the same or similar parts in the various views.

Fig. 1 is a somewhat diagrammatic longitudinal vertical section through a typical combined liquid and granular material can filling machine, showing the parts inactive as when no cans are in position to receive the measured charges;

Fig. 2 is a fragmentary development taken along the line 2—2 of Fig. 1, and showing the manner in which the measured batches of granular material are released laterally for free gravitation into the successive cans;

Fig. 4 is a transverse vertical section through the liquid batch measuring unit and through a portion of the granular material batch measuring mechanism, the section being taken along the line 4—4 of Fig. 1;

Fig. 5 is a diagrammatic section through the lowermost granular material measuring pockets showing all of the solenoid actuated material delivery gates closed and no cans in position to receive charges, but depicting the successive can positions in dot-and-dash lines;

Fig. 6 is a similar diagram, showing the first granular material delivery gate open and a can initially receiving a measured batch of material from one of the measuring pockets;

Figure 3:
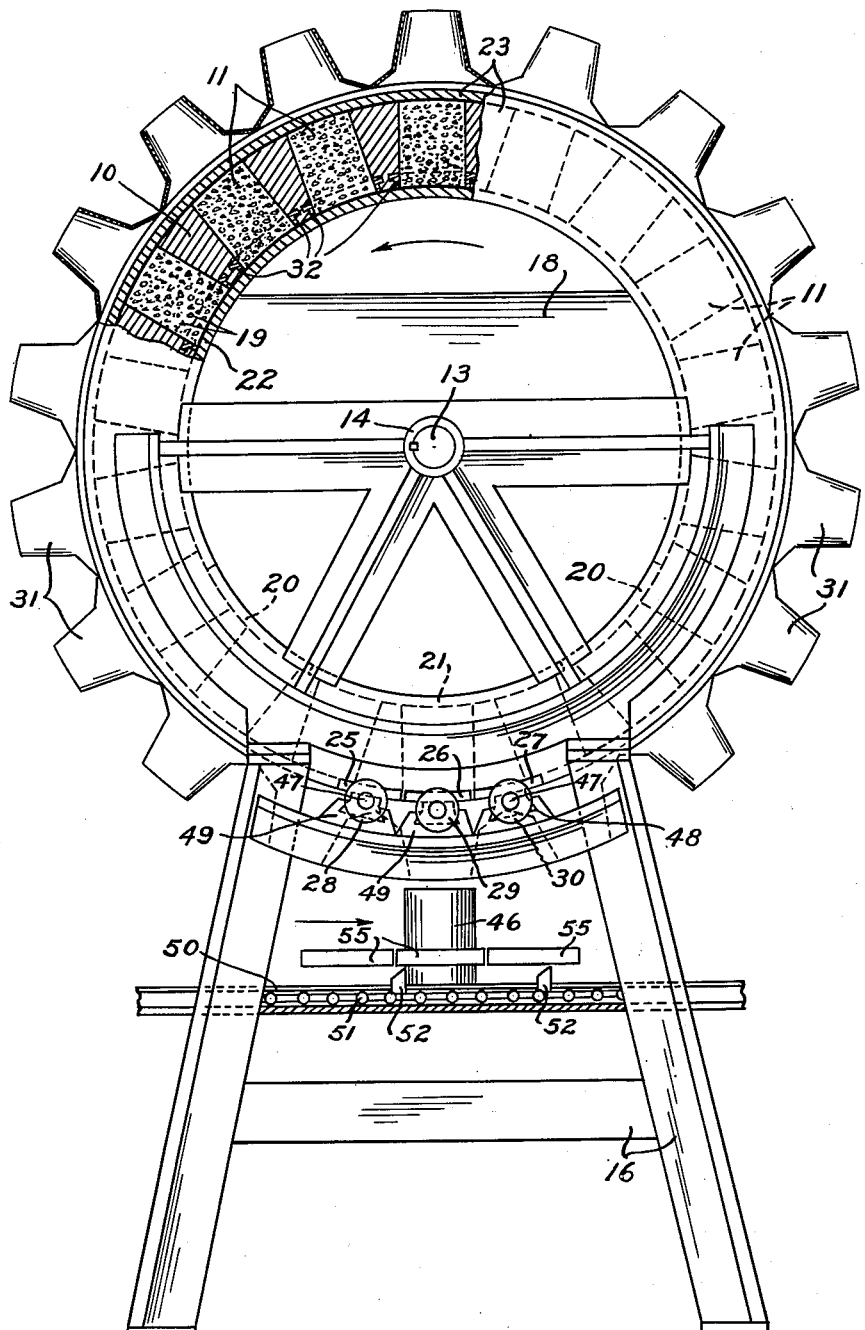
Fig. 3 is a similarly diagrammatic end view of the granular material measuring and delivery mechanism, showing a can in position to receive a measured batch, and also showing a section through several of the series of granular material measuring pockets.

Fig. 7 is another similar diagram, showing the first and second material delivery gates open and two successive cans receiving batches of granular material from the adjacent downwardly exposed measuring pockets; and Fig. 8 is still another similar diagram showing all three of the solenoid actuated batch release gates open, and three successive cans simultaneously receiving granular material from the adjacent downwardly opened or exposed measuring pockets.

Although the invention has been shown in a rather diagrammatic manner and as being especially applicable to a filler adapted to handle granular materials such as peas and beans and or liquids such as brine or syrup and to deliver measured batches of such materials to successive open topped sanitary cans, it is not my desire or intention to unnecessarily limit the scope or utility of the improved features by virtue of this restricted embodiment. It is intended that the term granular material as employed herein shall cover any bulk solids having characteristics similar to peas, beans, berries or the like, and that the term liquid shall include diverse liquids other than brine or syrup, and that the term can shall include various types of metal, paper and plastic receptacles.

In accordance with my present invention, I have provided a receptacle filler consisting of an improved granular material batch measuring and dispensing unit, and a simultaneously operating but independently functioning liquid batch measuring and dispensing unit, both of which units are properly timed and cooperable to deliver accurately pre-measured batches of the respective commodities to successive rapidly advancing receptacles of a series; but which may be actuated so as to deliver only one type of either material to each of the travelling cans, and which moreover will not deliver any material if the succession of receptacles is interrupted.

Referring to the drawings, the improved granular material batch measuring and dispensing unit of the filler, comprises in general a rotor 10 having therein an annular series of equally spaced revolvable granular material measuring pockets 11 each provided with a laterally adjustable side wall 12, the rotor 10 being keyed to a main driving shaft 13 which is mounted in end bearings 14, 15 supported upon a fixed frame 16; a hopper 18 for supplying bulk granular material 19 to the revolving rotor pockets 11 through a pair of inlet openings 20 formed between the opposite ends of a lower stationary arcuate inner wall 21 and the adjacent ends of an upper stationary arcuate inner wall 22 forming part of a housing casing 23 for the rotor 10; a series of three adjacent lower batch discharge gates 25, 26, 27 cooperating with an arcuate outlet opening in the fixed casing 23 beneath the lower plate or wall 21 and being successively operable by solenoids 28, 29, 30 respectively, to deliver the measured batches of material 19 into adjacent hoppers 31 of a revolving series carried by the rotor 10; receptacle actuated mechanism for periodically energizing the solenoids 28, 29, 30 in succession to open the gates 25, 26, 27 in rapid succession; and other mechanism for effecting adjustment of the pocket side walls 12 in order to predetermine the volumes of the measured batches of granular material 19.

As shown in Figs. 1, 2 and 3, the measuring pockets 11 when being filled have lesser transverse cross-section than when being emptied, each pocket being bounded on one side by an integral part of the rotor 10, on its opposite side by one of the adjustable and movable walls 12, at its outer end by the fixed casing 23 and by the gates 25, 26, 27 when closed, and at its inner end by the walls 21, 22. The hoppers 31 are rigidly attached to the rotor 10 at points between the successive pockets 11 so as not to interfere with the lateral movement and adjustment of the walls 12, and each of these walls is provided with integral guide strips 32 which are slidable in grooves formed in the rotor 10, and with an arm 33 carrying a roller 34 at its outer end. These rollers 34 coact with an annular recess 35 formed in a stationary pocket volume adjusting disc 36, which is fixed against rotation by a rod 37 secured to the main frame 16, but is slidably mounted upon the main driving shaft 13, for adjustment purposes, see Figs. 1, 2 and 4. The annular recess 35 has an off-set at its lower portion as shown in Figs. 1 and 2, and the hub of the disc 36 which is bored to coact with the shaft 13, is also provided with an annular groove 42; and a flat bar 38 which passes through and is slidable along a slot 39 formed in the main shaft 13, has opposite ends revolvable freely within the annular groove 42. The mid-portion of the bar 38 is firmly attached to the inner end of a stem 40 the opposite end of which is screw threaded and the medial portion of which extends through a central bore or hole 41 formed in the drive shaft 13; and an adjusting hand wheel 43 coacts with the threaded outer end of the stem 40 and with a collar 44 secured to the end of the shaft 13 beyond the bearing 15, so that by turning the wheel 43 relative to the shaft 13, the adjusting disc 36 and the pocket walls 12 may be adjusted in either direction so as to enlarge or diminish the measuring capacity of the pockets 11.

The granular material supply hopper 18 is stationarily supported upon the main frame 16 and from the fixed walls 21, 22 of the casing 23, and is in constant open communication with the pocket inlet openings 20 as shown in Figs. 1 and 3. Granular material 19 may be supplied to the hopper 18 in any convenient manner, and this material is at all times free to gravitate from the hopper 18 through both openings 20 in to the inner ends of the measuring pockets 11 as the latter revolve past these openings. If the successive pockets 11 are completely filled as soon as they pass the right hand end of the lower wall 21 as viewed in Fig. 3, the material laden pockets 11 will merely continue to revolve until emptied by opening of the gates 25, 26, 27; but if these pockets have not been completely filled when they reach the opening 20 at the left of the lower wall 21, then additional material 19 will gravitate into and fill them, thus insuring complete filling and accurate measurement of the successive batches even when the pockets 11 are travelling at high speed.

The three successive discharge gates 25, 26, 27 which control the delivery of granular material 19 from the outer ends of the revolving pockets 11, are provided in order to insure complete and rapid discharge of all material by gravity aided by the outward movement of the walls 12 by the off-set in the recess 35 and by centrifugal force, while the pockets are advancing at high speed. These three gates 25, 26, 27 are adapted to be opened in rapid succession by the solenoids 28, 29, 30 respectively, whenever a receptacle or can 46 is in position to receive a measured batch of material 19 from a corresponding pocket 11. Each of the solenoids 28, 29, 30 comprises an electrically energizable coil and a core 47 movable therein whenever the coil is energized, and each of the movable cores 47 is connected to its corresponding gate 25, 26, 27 by means of a slide 48 which is reciprocable within a guide 49 fixedly mounted upon the main frame 16, see Figs. 1 and 3. The successive cans 46 are transportable at any desired speed and in a straight line, along a rectilinear can support 50, by means of an endless conveyor 51 having can engaging lugs 52 properly spaced so as to cause the open tops of the cans 46 to properly register with the outlet openings of the successive hoppers 31 of the revolving series. The conveyor 51 and its support 50 may be of any conventional type, and is mounted upon the frame 16 in vertical alinement with the path of revolution of the pockets 11 and of the hoppers 31; and a series of three bell cranks 53 each swingably supported upon a bracket 54 secured to the main frame 16 near the conveyor 51, is provided for effecting successive actuation of the solenoids 28, 29, 30.

Each of the bell cranks 53 has one arm thereof provided with a can engaging bar 55, while its other arm is provided with two sets of movable switch contacts 56, 57 which are alternately cooperable respectively with sets of stationary or fixed contacts 58, 59, so as to reverse the direction of movement of the solenoid core 47 whenever the corresponding bell crank 53 is thrown from one extreme position of oscillation, to the other. The switch contacts 58, 59 are connected to the solenoids 28, 29, 30 and to the power supply line 60, by means of wiring 61 as shown diagrammatically in Fig. 1, and it is to be understood that each of the solenoids 28, 29, 30 is provided with an independent energizing bell crank 53 and bar 55, and a switch contact assemblage. With this system, the batch discharge gates 25, 26, 27 will obviously be positively opened to deliver measured charges of granular material 19, only when a bar 55 is engaged and swung to the right as viewed in Fig. 1, by a passing receptacle or can 46; and as each can releases or disengages the bar 55, the corresponding solenoid 28, 29, 30 will be immediately energized to positively close its gate 25, 26, 27. If a measuring pocket 11 has been filled and no can 46 is in position to receive the measured batch, then the filled pocket will merely continue to revolve until the gates are actually opened, thus eliminating waste of granular material 19 due to the absence of receiving receptacles.

The liquid batch measuring and dispensing unit of the filler is preferably of the type specifically described and claimed in my copending application executed March 19, 1946, now Patent No. 2,554,939 and comprises in general a rotor 63 mounted upon a horizontal shaft 64 and having therein an annular series of liquid measuring pockets 65 revolvable about the shaft axis; a liquid supply tank 66 mounted upon the main frame 16 and having therein a quantity of liquid 67 such as brine or syrup, through which the rotor pockets 65 are successively revolvable; a stationary arcuate flange or inner wall 68 extending into the rotor 63 and cooperating with its fixed supporting wall 69 to seal the pockets 65 after they have been filled with liquid from the tank 66; an outer adjustable ring 71 embracing the rotor 63 and sealing the outer ends of the revolving pockets 65, the ring 71 being suspended from the wall 69 and provided with a liquid spillage opening 72 which is adjustable toward and away from the liquid supply basin by means of a pinion 73 meshing with peripheral teeth 74 formed on the ring 71, to vary the volumes of the measured batches; and a liquid batch discharge valve 75 cooperating with an upper outlet opening 76 formed in the tank wall 69 and being operable by can actuated mechanism to deliver the successive pre-measured batches of liquid into the successive hoppers 31 whenever cans 46 are available to receive the charges, see Figs. 1 and 4.

The rotor supporting and driving shaft 64 is journalled in bearings carried by the tank 66 and has a gear 78 at its outer end which meshes with another gear 79 secured to the corresponding end of the main driving shaft 13, and power may be applied to the opposite end of the upper shaft 13 by means of a sprocket 80 or otherwise. The element 44 which prevents axial shifting of the hand wheel 43 during adjustment of the granular material measuring pockets 11, may be fastened to the gear 79 or to the shaft 13 in any suitable manner; and the ring adjusting pinion 73 for varying the position of the spillage opening 72, may be mounted upon a shaft 81 journalled in a fixed bracket 82 and which is rotatable for adjustment purposes by a crank 83. It will be apparent that the revolving liquid measuring pockets 65 are completely filled as they advance through the liquid 67 in the tank 66, and that more or less liquid will be spilled from each pocket 65 back into the tank, depending upon the elevation of the spillage opening 72 as determined by rotary adjustment of the ring 71, and this ring is journalled for such adjustment in the tank wall 69.

The liquid batch discharge valve 75 which coacts with the outlet opening in the tank wall 69, is pivotally suspended from this wall and is operable by a lever 85 connected by an adjustable link 86 to a slide or bar 87 which is slidable vertically along the outer surface of the wall 69, and is positively guided upon this wall. The slide bar 87 is constantly urged in a downward direction tending to close the valve 75, by means of a tension spring 88, and a bell crank 89 having one arm provided with a can engaging bar 90 and its other arm coacting with spaced lugs 91 on the bar 87, is adapted to lift the bar and to open the valve 75 whenever a passing can 46 engages the bar 87 and swings the bell crank in a clockwise direction as viewed in Fig. 1. This assemblage constitutes a no-can no-fill mechanism which permits the contents of the successive liquid measuring pockets 65 to be delivered past the valve and through the revolving hoppers 31, only when cans 46 are in position to receive the charges, and when no cans are thus positioned, the liquid laden pockets 65 will merely continue to revolve within the tank 66. The liquid delivery control bar 90 should also be so positioned with respect to the can conveyor 51 and relative to the granular material delivery control bars 55, that at least some liquid 67 from each measured batch will be delivered to each can 46 through the adjacent revolving hopper 31, before granular material 19 from the complementary measured batch is delivered into the same can, and after the initial entry of liquid, the delivery of liquid and solids may be simultaneous.

During normal operation of the improved can filling machine, the granular material and liquid measuring units may be operated either simultaneously to deliver charges of mixed granular material and liquid to each of the advancing cans 46, or independently so as to deliver a batch of granular material 19 or a batch of liquid 67 alone, to each of the successive cans. The volumes of the batches of granular material and liquid may be independently, quickly and accurately adjusted to suit varying conditions, and when the machine is being utilized as a combined filler, the proportions of the ingredients in each charge of mixture may be varied at will by merely manipulating the hand wheel 43 and the crank 83. When operating as a combined or mixture filler, both the granular material control bars 55 and the liquid control bar 90 should be positioned for active cooperation with the advancing cans 46, but the bars 55 may be made inactive by merely shutting off the supply of electric current when filling liquid alone, and the bar 90 may be removed from the can path when delivering granular material alone to the cans.

After proper volume adjustment has been effected and assuming the machine to be operated as a mixed batch dispenser, when power is applied to the main shaft 13 through the sprocket 80, the rotors 10, 63 and their measuring pockets 11, 65 will be constantly revolved about the axes of their respective carrying shafts 13, 64. As the successive pockets 11 advance past the supply openings 20, they are quickly filled with accurately measured batches of granular material 19, and as the successive pockets 65 are carried through the liquid 67 in the tank 66 and past the spillage opening 72, they too are supplied with accurately pre-measured batches of liquid. The cans 46 may then be transported in a straight line and at high speed between the control bars 55, 90, and as each can engages these bars, a pre-measured batch of liquid 67 is delivered to the can through the adjacent revolving spout or hopper 31, and a pre-measured batch of granular material is also delivered to the same can through the same hopper by successive opening of the gates 25, 26, 27 as clearly indicated by the diagrams in Figs. 5, 6, 7 and 8. As depicted in Fig. 5, when no can 46 is present, no material will be delivered from either measuring unit, but when cans 46 are present, the materials will be delivered thereto in rapid succession as illustrated in Figs. 6, 7 and 8, and each can will ultimately be supplied with an accurately pre-measured batch of the final mixture.

From the foregoing detailed description it will be apparent that my present invention provides an improved receptacle filler which is simple, compact and durable in construction, and which is moreover adapted to effectively deliver accurately measured successive batches of mixed granular material and liquid, or of granular material alone, or of liquid alone to each of a series of cans 46 or the like, while travelling at high speed through the filling zone. The volumes of the measured batches may be readily varied, so as to vary the proportions of the ingredients in each batch of mixture, and all operations are performed automatically without waste of materials and without undesirably damaging the granules of the solid material. The provision of two feed openings 20 for the granular material measuring pockets 11 insures proper complete filling of these pockets by gravity, and the provision of the three successive solenoid actuated gates 25, 26, 27 and the horizontal disposition of the axis of revolution likewise insures rapid and complete emptying of the pockets by gravity aided by centrifugal force. The automatic outward movement of the walls 12 of the successive commodity filled measuring pockets 11 by the lower off-set in the annular recess 35 of the adjusting disc, when these pockets are cut-off from the supply hopper 18 and are delivering their measured batches to the receptacles, is an important feature of my present invention, since it releases the charges of granular material and permits free gravitation thereof from within the pockets, thereby permitting the machine to be operated at exceptionally high speed. The volume adjustments for the liquid and granular material batches may be effected while the machine is operating, and all parts of the mechanism besides being of simplified construction, are readily accessible for inspection and cleaning. The improved receptacle filler may obviously be utilized to pack diverse commodities in various types of receptacles, and is safely operable at very high speeds.

It should be understood that it is not desired to limit this invention to the exact details of construction and operation, herein shown and described, for various modifications within the scope of the appended claims may occur to persons skilled in the art.

I claim:

1. In a receptacle filler, an annular series of measuring pockets revolvable about a horizontal axis and each having a wall movable to vary the volume of the pocket, means for simultaneously moving all of said walls to correspondingly vary the pocket volumes, means for feeding material into the inner ends of the revolving pockets, and a series of successively removable gates for effecting delivery of said material from the outer ends of said pockets by gravity aided by centrifugal force acting upon said material.

2. In a receptacle filler, an annular series of measuring pockets revolvable about a horizontal axis and each having a wall movable to vary the volume of the pocket, means for simultaneously moving all of said walls to correspondingly vary the pocket volumes, a casing enclosing said pockets and having a material discharge opening communicable with the outer ends of the pockets when in lowermost position and also having several inlet openings communicable with the inner pocket ends on opposite sides of said discharge opening, and a series of successively removable gates for periodically uncovering said discharge opening.

3. In a receptacle filler, an annular series of measuring pockets revolvable about a horizontal axis and each having a wall movable to vary the volume of the pocket, means for simultaneously moving all of said walls to correspondingly vary the pocket volumes, a casing enclosing said pockets and having a material discharge opening communicable with the outer ends of the pockets when in lowermost position and also having several inlet openings communicable with the inner pocket ends on opposite sides of said discharge opening, and a series of successively removable gates normally sealing said discharge opening.

4. In a receptacle filler, an annular series of measuring pockets revolvable about a horizontal axis, a casing having a material discharge opening communicable with the outer ends of the revolving pockets when in lowermost position, a series of successive gates normally sealing said opening, and means for opening said gates in rapid succession so as to gradually deliver the contents of each pocket.

5. In a receptacle filler, an annular series of measuring pockets revolvable about a horizontal axis, a casing having a material discharge opening communicable with the outer ends of the revolving pockets when in lowermost position, a series of successive gates normally sealing said opening, means for opening said gates in rapid succession so as to gradually deliver the contents of each pocket, and an electric solenoid for opening said gates in rapid succession as each pocket advances along said opening.

6. In a receptacle filler, an annular series of measuring pockets revolvable about a horizontal axis, a casing having a material discharge opening communicable with the outer ends of the revolving pockets when in lowermost position, a series of successive gates normally sealing said opening, means for advancing a series of receptacles beneath the path of revolution of said pockets and in alinement with said opening, and means operable by the advancing receptacles for opening said gates in rapid succession as each pocket advances along said opening in the direction of travel of said receptacles.

7. In a receptacle filler, an annular series of measuring pockets revolvable about a horizontal axis, a casing having a material discharge opening communicable with the outer ends of the revolving pockets when in lowermost position, a series of successive gates normally sealing said opening, means for advancing a series of receptacles beneath the path of revolution of said pockets and in alinement with said opening, and electric solenoids energized by the advancing receptacles for opening said gates in rapid succession.

8. In a receptacle filler, an annular series of measuring pockets revolvable about a horizontal axis, a casing having a material discharge opening communicable with the outer ends of the revolving pockets when in lowermost position, a series of successive gates normally sealing said opening, means for advancing a series of receptacles beneath the path of revolution of said pockets and in alinement with said opening, an electric solenoid for opening each of said gates, and means operable by the advancing receptacles for energizing said solenoids in rapid succession as each receptacle passes beneath said opening.

9. In a receptacle filler, a rotor having therein an annular series of measuring pockets each provided with a movable wall for varying the pocket volume, each of said walls having a projection extending outwardly of the adjacent pocket and being revolvable with said rotor, a disc fixed against rotation but being movable toward and away from said rotor and engaging all of said projections, a rotor carrying and driving shaft, and means extending through said shaft for moving said disc to vary the volumes of said pockets.

10. In a receptacle filler, a rotor having therein an annular series of measuring pockets each provided with a movable wall for varying the pocket volume, each of said walls having a projection extending outwardly of the adjacent pocket and being revolvable with said rotor, a roller carried by each of said wall projections, a rotor carrying and revolving shaft, a disc fixed against rotation but being slidable upon said shaft toward and away from said rotor and engaging said rollers, and means carried by said shaft for moving said disc to simultaneously vary the volumes of all of said pockets.

11. In a receptacle filler, a rotor having therein an annular series of measuring pockets each provided with a movable wall for varying the pocket volume, each of said walls having a projection extending outwardly of the adjacent pocket and being revolvable with said rotor, a roller carried by each of said wall projections, a rotor carrying and revolving shaft, a disc fixed against rotation and having a peripheral recess engaging all of said rollers, and means extending through said shaft and coacting with said disc to effect adjustment thereof along said shaft.

12. In a receptacle filler, a rotor having therein an annular series of measuring pockets each provided with a movable material confining wall and an opening for discharging material, means for revolving said rotor, means for supplying material to said pockets during revolution of said rotor, and means for automatically moving said pocket walls away from the measured batches of material confined within said pockets whenever said pockets have been cut-off from said supply means and the charges are being delivered through said openings.

13. In a receptacle filler, means forming a series of measuring pockets each having an upper inlet and a lower outlet and a laterally movable wall between said inlet and outlet, means for advancing said series along a definite path, means for admitting material to the successive pockets through the inlet thereof and for closing said inlet when the pocket has been filled, means for opening the outlets of the successive pockets after the inlets thereof have been closed, and means for automatically moving said walls away from the charges confined within said pockets whenever the inlets thereof have been closed and the outlets have been opened.

14. In a receptacle filler, an annular series of granular material measuring pockets revolvable about a horizontal axis, an annular series of discharge hoppers surrounding said pocket series and being revolvable about the same axis with each hopper disposed in radial alinement with one of said pockets, an annular series of liquid material measuring pockets revolvable about a different axis adjacent to said hoppers, means for simultaneously revolving all of said pockets and hoppers to cause each of said granular and liquid material measuring pockets to deliver their contents into one of said hoppers, means for advancing receptacles in series along a rectilinear path and in communication with the successive hoppers of said series, and means operable by the advancing receptacles for effecting said delivery of materials from the pockets into the hoppers.

15. In a receptacle filler, an annular series of granular material measuring pockets revolvable about a horizontal axis, an annular series of discharge hoppers surrounding said pocket series and being revolvable about the same axis with each hopper disposed in radial alinement with one of said pockets, an annular series of liquid material measuring pockets revolvable about a different axis adjacent to said hoppers, means for simultaneously revolving all of said pockets and hoppers to cause each of said granular and liquid material measuring pockets to deliver their contents into one of said hoppers, means for advancing receptacles in series along a rectilinear path and in communication with the successive hoppers of said series, means operable by the receptacles for effecting said delivery of materials from the pockets into the hoppers, and means for effecting independent variation of the volumes of the pockets in each of said series.

16. In a receptacle filler, an annular series of granular material measuring pockets revolvable about a horizontal axis, an annular series of discharge hoppers surrounding said pocket series and being revolvable about the same axis with each hopper disposed in radial alinement with one of said pockets, an annular series of liquid material measuring pockets revolvable adjacent to said hoppers about a parallel horizontal axis located below said first mentioned axis, means for simultaneously revolving all of said pockets and hoppers to cause the successive lowermost granular measuring pocket and the uppermost liquid material measuring pocket of the two annular series to deliver their contents into the successive lowermost hoppers of the hopper series, means for advancing receptacles in communication with said successive lowermost hoppers, and means operable by the advancing receptacles for effecting said delivery of materials from the pockets into the hoppers.

17. In a receptacle filler, an annular series of granular material measuring pockets revolvable about an axis, an annular series of discharge hoppers surrounding said pocket series and being revolvable about the same axis with each hopper disposed in radial alinement with one of said pockets, an annular series of liquid material measuring pockets revolvable about a different axis adjacent to said hoppers, means for revolving said pockets and hoppers to cause one pocket of each pocket series to deliver its contents into the same hopper of said hopper series, means for advancing receptacles in communication with the successive hoppers of said hopper series, and means operable by the advancing receptacles for controlling said delivery of materials from the pockets into the hoppers.

18. In a receptacle filler, an annular series of granular material measuring pockets revolvable about an axis, an annular series of discharge hoppers surrounding said pocket series and being revolvable about the same axis with each hopper disposed in radial alinement with one of said pockets, an annular series of liquid material measuring pockets revolvable about a different axis adjacent to said hoppers, means for revolving said pockets and hoppers to cause one pocket of each pocket series to deliver its contents into the same hopper of said hopper series, means for effecting independent variation of the effective volumes of the pockets in each of said series, means for advancing receptacles in communication with the successive hoppers of said hopper series, and means operable by the advancing receptacles for controlling said delivery of materials from the pockets into the hoppers.

FRANK D. CHAPMAN.

REFERENCES CITED

The following references are of record in the file of this patent:

UNITED STATES PATENTS

| Number | Name | Date |
|---|---|---|
| 699,699 | Newberry | May 13, 1902 |
| 792,918 | Ohlendorf et al. | June 20, 1905 |
| 1,527,406 | Hansen | Feb. 24, 1925 |
| 1,815,321 | Martin | July 21, 1931 |
| 2,156,271 | Beck | May 2, 1939 |
| 2,158,767 | Ayars | May 16, 1939 |